Figure 1:
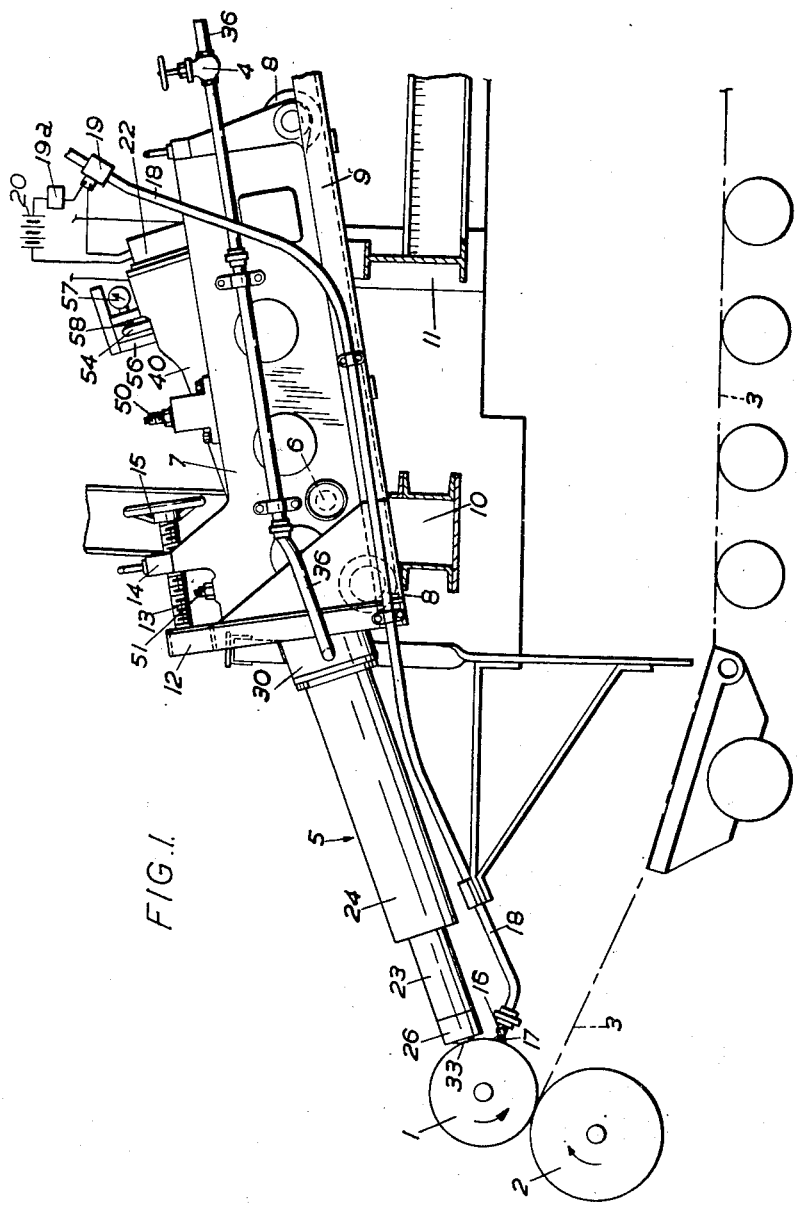

Dec. 14, 1954  R. DAVISON ET AL  2,696,698
APPARATUS FOR DETECTING BOWING IN ROTATING CYLINDERS
OR ROLLS AND FOR STRAIGHTENING ROTATING CYLINDERS
OR ROLLS BY CONTROLLING THE BOWING WHEN DETECTED
Filed Sept. 1, 1951  3 Sheets-Sheet 1

Richard Davison,
William Arthur Lightfoot  Inventors

Morrison, Kennedy & Campbell
By
Attorneys

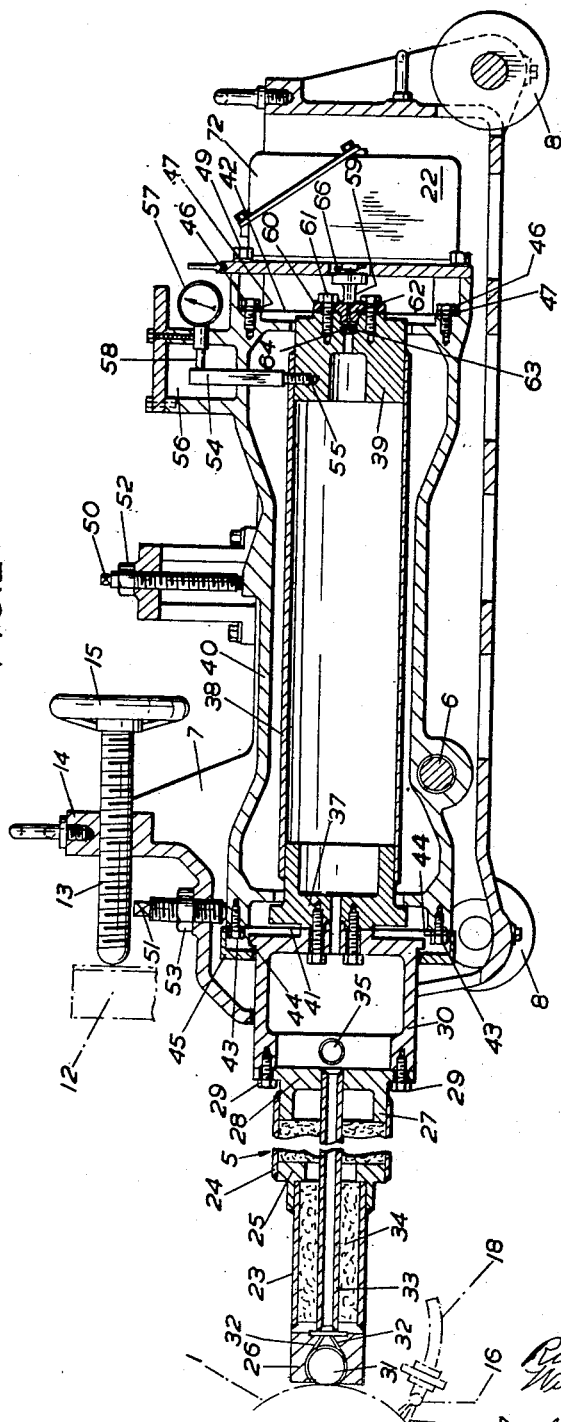

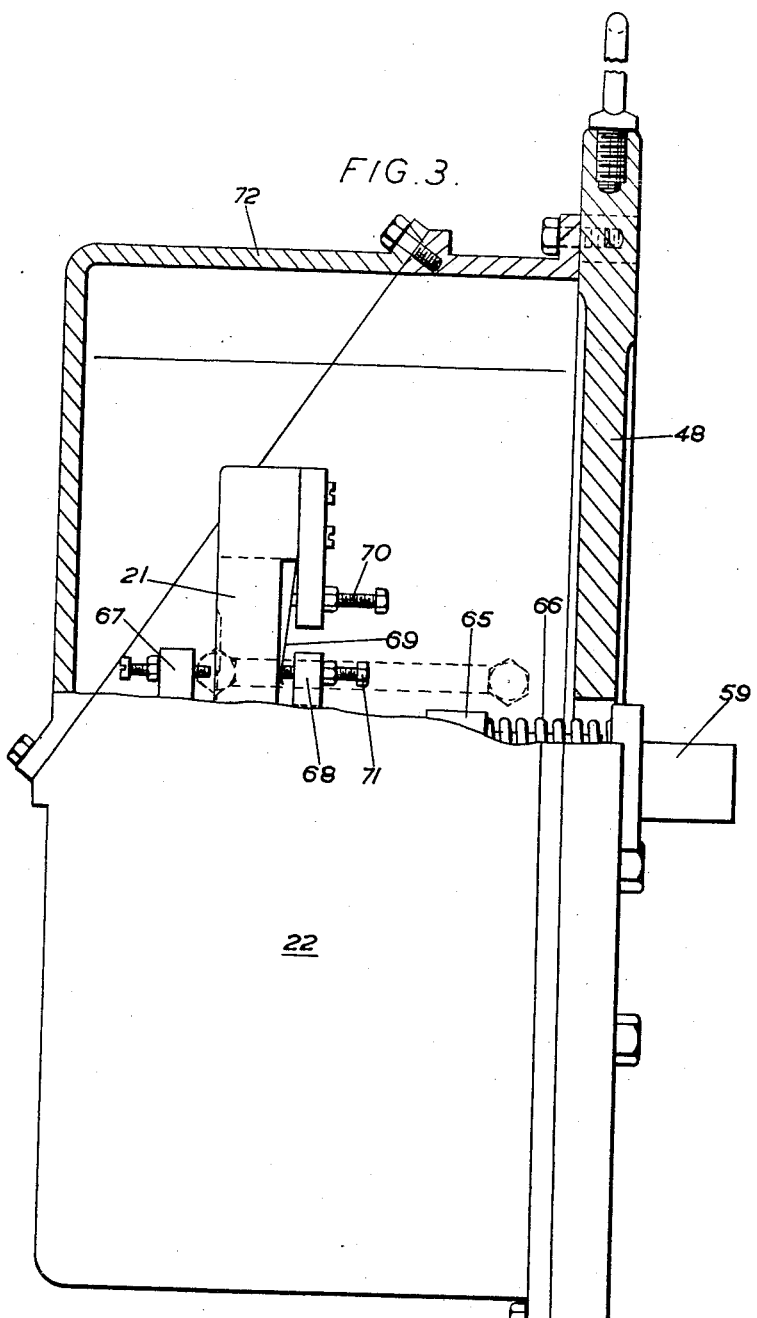

United States Patent Office 2,696,698
Patented Dec. 14, 1954

2,696,698

APPARATUS FOR DETECTING BOWING IN ROTATING CYLINDERS OR ROLLS AND FOR STRAIGHTENING ROTATING CYLINDERS OR ROLLS BY CONTROLLING THE BOWING WHEN DETECTED

Richard Davison, St. Helens, and William Arthur Lightfoot, Barnby Dun, England, assignors to Pilkington Brothers Limited, Liverpool, Lancaster County, England, a corporation of Great Britain Application September 1, 1951, Serial No. 244,832

7 Claims. (Cl. 49—14)

This invention relates to method of and apparatus for controlling bowing in rotating cylinders or rolls.

The invention is particularly advantageous for use in straightening the internally water-cooled casting cylinders or rolls used in continuous plate glass processes. Such cylinders which are slow moving members rotating at a speed of the order of one to ten revolutions per minute sometimes have a tendency to bend axially when in use owing to a number of causes or combinations of causes, some of which are hereinafter mentioned. When bowing of the cylinders occurs it results in the production of a cyclic variation in the thickness of the glass ribbon being produced and this, as will be understood, is an undesirable feature.

A cylinder may bow as a result of any of the following causes or of combinations of such casues: local differences in the surface emissivity of the cylinder, local differences in the co-efficient of heat transfer from the molten glass to the cylinder, variations in the cylinder wall thickness, local variations in the co-efficient of heat transfer from the cylinder bore to the cooling water, local variations in the conductivity of the cylinder material, local variations in the specific heat of the cylinder material, local variations in the specific gravity of the cylinder material, local variations in the flow of the internal cooling water, or distortion due to ageing of the cylinder material.

It is a main object of the invention to provide apparatus which will detect when the cylinder becomes axially bowed as a result of any of the foregoing causes or combinations thereof, or for any other reason, and to effect the straightening of the cylinder as a result of the detection of the bowing thereof.

The present invention comprehends a method of correcting a departure from true form of a cylinder by sensing the local bowing of the cylinder and in consequence altering the temperature distribution around the circumference thereof by a timed and synchronised stream of heat transferring medium applied to the bowed portion only of the cylinder.

According to the present invention there is provided for detecting bowing in rotating cylinders and for straightening cylinders by controlling the bowing when detected, apparatus comprising a sensing device responsive to bowing in the cylinder and active over that portion of the length of a cylinder wherein maximum bowing occurs, delivery means for directing a stream of heat transferring medium onto the sensed bowed portion of the cylinder or roll when it is in the trajectory of the stream, a valve controlling the supply of heat transferring medium to the delivery means, and actuating means for the valve operable under control of said sensing device to effect delivery of the stream only during passage of the sensed bowed portion through the trajectory of the stream.

The invention also comprehends for detecting bowing in rotating cylinders and for straightening cylinders by controlling the bowing when detected, apparatus comprising a sensing member responsive to bowing in the cylinder and arranged to run on that portion of the length of the cylinders wherein maximum bowing occurs, the sensing member being mounted for displacement from the cylinder when a bowed portion of the cylinder passes the sensing member, delivery means for directing a stream of heat transferring medium on to the sensed bowed portion of the cylinder when it is in the trajectory of the stream, a valve controlling the supply of heat transferring medium to the delivery means, and actuating means for the valve operable under control of said sensing member to effect delivery of the stream only during passage of the sensed bowed portion through the trajectory of the stream.

Although as mentioned above the apparatus according to the invention has been found to be particularly advantageous for straightening water-cooled casting cylinders or rolls as used in a continuous plate glass process, it will be understood that the apparatus can be employed for straightening cylinders or rolls employed in any rolling process used to produce material of uniform thickness in sheet form under thermal conditions.

Accordingly the delivery means may comprise an apertured conduit for delivering a stream or streams of a gaseous medium to the sensed bowed portion of the cylinder or roll.

In order that the invention may be more clearly understood a preferred embodiment thereof will now be described, by way of example with reference to the accompanying diagrammatic drawings, in which, Fig. 1 is a diagrammatic illustration of apparatus according to the invention applied to a continuous plate glass process, Fig. 2 is a side sectional elevation on an enlarged scale of part of Fig. 1, and Fig. 3 is a side sectional elevation of a part of a switch housing shown in Figs. 1 and 2.

In the drawings like references designate similar parts.

Referring to the drawings 1 indicates the internally water-cooled casting cylinder as normally used in the continuous plate glass process. As is well known the cylinder rotates at the rate of about one to ten revolutions per minute which results in the cylinder having a very slow linear speed. 2 indicates the usual bottom roll which co-operates with cylinder 1 to roll a continuous sheet of glass, as indicated by the chain line 3.

At the position where maximum bowing of the cylinder occurs there is provided, to co-operate with that part of the circumference of the cylinder, a sensing member indicated generally in Fig. 1 at 5. The sensing member is pivoted at 6 to a carriage 7 having wheels 8 running in tracks 9 supported on a framework of which part is indicated at 10 and 11. Also supported (by means not shown) on the framework and rigid therewith is an abutment 12 co-operating with a threaded shaft 13 threaded through a bridge piece 14 on the carriage 7 and having a hand wheel 15 by which the shaft 13 can be rotated to vary the position of the carriage 7 relative to the abutment 12 and hence the position of the sensing member 5 relative to the casting cylinder 1 for a purpose hereinafter to be described.

An apertured conduit 16 extending lengthwise of the cylinder 1 is arranged, under control from the sensing member, to apply a cooling stream or streams 17 of cold air to the casting cylinder 1, air being supplied to the conduit 16 by a pipe 18 from a source not shown. Air is supplied to the conduit under the control of an electro-pneumatic valve 19 which is energised through any suitable form of time-delay mechanism, indicated diagrammatically at 19a, Fig. 1, by electric current from a source of supply 20 which is under the control of a micro-switch 21, Fig. 3, contained within a housing 22 for actuation by the sensing member 5 as hereinafter described.

Referring now more particularly to Fig. 2 of the drawings the sensing member 5 comprises two tubular members 23 and 24 connected together by a collar member 25 welded to both. The tubular member 23 terminates in a sensing head 26 welded thereto and tubular member 24 is welded to a boss 27 on a cover 28 bolted at 29 to a chamber 30. To prevent the roller 31 from becoming too hot air ducts 32 are formed in the head 26 and communicate with a tube 33 surrounded by heat insulating material 34. The end of tube 33 which is remote from the head 26 opens into the chamber 30 which has an inlet 35 connected with a pipe 36, Fig. 1, which, under control of a hand-operated valve 4, permits cool air from a source not shown to be delivered to the chamber 30 and ducts 32 to effect cooling of roller 31 when desired.

Chamber 30 is secured by bolts to an end closure plug 37 of a cylinder 38 having a closure plug 39 at its other end. The sensing member thus comprises the cylinder 38, chamber 30, tubular members 24, 23, head 26 and roller 31 and is partly suspended within a housing 40 by means of diaphragms 41 and 42 at opposite ends of cylinder 38. The diaphragm 41 is secured to the end of the housing 40 by means of bolts 43 and clamping strips 44 and a cover member 45 is provided. The diaphragm 42 is secured to the other end of the housing 40 by bolts 46 and clamping strips 47 and a cover plate 48 is secured to this end of the housing 40 by bolts 49. The sensing member is thus free to move axially of the housing 40 which latter is pivoted to the carriage 7 by means of the pivot bolt 6.

The sensing member is adjusted in position with respect to the housing 40 by means of adjusting screws 50 and 51 carried by the carriage 7 and bearing against the top of the housing 40 on opposite sides of the pivot 6. The adjusting screws are provided with lock nuts 52 and 53 respectively.

A stud 54 is secured by its threaded end 55 to the outer end plug 39 of cylinder 38 and projects into a chamber 56 at the top of the housing 40 in one wall of which is mounted a dial gauge 57 on which the feeler 58 engages the plug 54 to indicate the axial displacement of the sensing member with respect to the housing 40. This axial movement of the member 5 is caused to operate the micro-switch 21 contained within the housing 22.

The motion which is transferred to the sensing member 5 is a composite motion of varying frequencies of oscillation including a frequency of oscillation resulting from the eccentricity of the casting cylinder due to the bowing thereof. The other frequencies of oscillation from which the composite motion is derived are primarily caused by changes due to alterations in position of the bearings of the cylinder in relation to the mounting of the sensing member, and to cylinder surface roughness and vibration in the cylinder drive.

For the purpose of correcting the form of the roll the only motion which it is desired to transmit to operate the micro-switch 21 is that which has the frequency of the bowed portion of the cylinder. Accordingly the housing 22 also contains a compensating motion-transmitter of a character such that it will suppress oscillatory movements of frequencies much above and below that due to bowing of the cylinder and will amplify the motion transmitted and which represents said bowing. The compensating motion transmitter forms no part of the present invention and may comprise any suitable known form of transmitter which includes an input member 59 for actuation by the sensing member 5 and a motion transmitter device to actuate the micro-switch 21. Some suitable forms of transmitter are described in the copending applications for United States Letters Patent by Richard Barradell Smith and Richard Davison Serial Nos. 244,833 and 244,834, both filed 1st September 1951, now issued as Patents Nos. 2,637,167 and 2,637,168, respectively, and by Richard Davison and Hubert Cecil Wynne Serial No. 244,835 filed 1st September 1951.

The diaphragm 42 is clamped to the end plug 39 of the cylinder 38 by means of a flanged member 60 secured in position by bolts 61. The member 60 is provided with a venting bore 62 registering with the bore 63 of a jet plug 64, the bore 63 permits the maintenance of a plenum in the housing 22 so that there is from the joints of the housing 22 a constant leakage of air from chamber 30 to prevent the entry of external dust-laden air into the housing 22.

The input member 59 for the motion transmitting device is slidable axially in a bearing member 65, Fig. 3, and abuts the flanged member 60 for axial movement thereby against the action of a spring 66 which urges the roller 31 against the surface of the casting cylinder 1.

The motion transmitting device is formed by two rocking arms 67, 68, operable by a lost-motion device not shown, straddling the electric micro-switch 21 and the micro-switch is provided with a preloading spring 69 adjustable by screw 70 to adjust the operating load of the switch.

The arm 68 of the motion transmitting device is provided with a screw 71 disposed to engage the operating element 69 of the micro-switch. The housing 22 is provided with a removable cover 72 to give access to the interior of the housing.

It will, of course, be understood that any desired magnification of the motion of the input member 59 can be obtained by suitable choice of the length of the rocking arms 67, 68.

The operation of the apparatus is as follows:

The roller 31 of the sensing head 26 runs on the surface of the casting cylinder 1 as the latter rotates and immediately a convexity commences it is sensed by the sensing roller 31, the latter is then displaced from the casting cylinder 1 and moves the sensing member 5 axially with respect to the housing, and as a consequence the input member 59 is caused to operate the micro-switch 21 to energise the valve 19 to permit the passage of a stream of cooling air through the conduit 16 on to the cylinder 1 when the bowed portion reaches the trajectory of the stream. When the bowed portion of the cylinder 1 passes beyond the stream the micro-switch 21 is released to de-energise valve 19 and so shut off the air supply. A stream of cooling air is thus projected on to the convex bowed portion of the cylinder 1 each time the cylinder rotates and the eccentricity of the cylinder is indicated on the gauge 57. The hand wheel 15 can be rotated by the operator to adjust the position of the sensing device with respect to the cylinder 1.

In the embodiment of the invention illustrated in Fig. 1 in which the conduit 16 is disposed below the sensing roller 31 the micro-switch 21 operates the valve 19 through the time-delay mechanism 19a, so as to allow for the time which elapses between the sensing of a concavity by roller 31 and the arrival of the concavity in the trajectory of the stream or streams 17 which issue from the conduit 16 under control of the switch 21 and valve 19. It will, however, be understood that if the conduit 16 is disposed on the other side of the roller 31 a time-delay mechanism is not always necessary.

Although in the foregoing description apparatus according to the invention has been described as applied to a cylinder rotating at a rate of about one to ten revolutions per minute, it is to be understood that the apparatus herein described is suitable for application to cylinders operating at speeds of up to about 100 revolutions per minute.

The apparatus herein described can be employed in continuous cold rolling processes, but it will be understood that when so employed a hot air stream or gas stream would be substituted for the cold air stream referred to above, and that otherwise it would be applied in the same manner as the cold air stream above mentioned except that it is applied to the concavely bowed side of the circumference of the cylinder. It can also be employed for maintaining the straightness of rotating hollow cylinders such as are used as rotary furnaces or chemical reaction chambers.

Further, it will be understood by those skilled in the art that, if desired, instead of a sensing roller 31 there may be employed for sensing the cylinder 1 means such as a fluid jet, or an electrical sensing means whereby as the gap between the surface of the cylinder and the sensing device varies there may be varied an electrical capacitance or a magnetic reluctance which will control the micro-switch 21.

What we claim is:

1. For detecting bowing in rotating cylinders and for straightening cylinders by controlling the bowing when detected, apparatus comprising a sensing device responsive to bowing in the cylinder and active over that portion of the length of a cylinder wherein maximum bowing occurs, delivery means for delivering a stream of heat transferring medium on to the sensed bowed portion of the cylinder when it is in the trajectory of the stream, a valve controlling the supply of heat transferring medium to the delivery means, and actuating means for the valve operable under control of said sensing device to effect delivery of the stream only during passage of the sensed bowed portion through the trajectory of the stream.

2. For detecting bowing in rotating cylinders and for straightening the cylinders by controlling the bowing when detected, apparatus comprising a sensing member responsive to bowing in the cylinder and arranged to run on that portion of the length of the cylinders wherein maximum bowing occurs, the sensing member being mounted for displacement from the cylinder when a bowed portion of the cylinder passes the sensing member, delivery means for directing a stream of heat transferring medium on to the sensed bowed portion of the cylinder when it is in the trajectory of the stream, a valve controlling the supply of heat transferring medium to the delivery means, and actuating means for the valve operable under control of said sensing member to effect delivery of the stream only during passage of the sensed bowed portion through the trajectory of the stream.

3. For detecting bowing in rotating cylinders and for straightening cylinders by controlling the bowing when detected, apparatus comprising a sensing device responsive to bowing in the cylinder and active over that portion of the length of a cylinder wherein maximum bowing occurs, an apertured conduit to deliver at least one stream of heat transferring medium on to the sensed bowed portion of the cylinder when it is in the trajectory of the stream, a valve controlling the supply of heat transferring medium to the delivery means, and actuating means for the valve operable under control of said sensing device to effect delivery of the stream only during passage of the sensed bowed portion through the trajectory of the stream.

4. For detecting bowing in rotating cylinders and for straightening cylinders by controlling the bowing when detected, apparatus comprising a sensing device responsive to bowing in the cylinder and active over that portion of the length of a cylinder wherein maximum bowing occurs, an apertured conduit to deliver at least one stream of heat transferring medium on to the sensed bowed portion of the cylinder when it is in the trajectory of the stream, a valve controlling the supply of heat transferring medium to the delivery means, an electric switch controlled by said sensing device, and a time-delay mechanism interposed between said switch and valve and operable under control of said sensing device to synchronise operation of the valve with the linear speed of the cylinder whereby the stream is delivered as the sensed bowed portion reaches the trajectory of the stream and is cut off as soon as the bowed portion of the cylinder has passed through the stream.

5. For detecting bowing in rotating cylinders and for straightening the cylinders by controlling the bowing when detected, apparatus comprising a sensing member responsive to bowing in the cylinder and arranged to run on that portion of the length of the cylinders wherein maximum bowing occurs, the sensing member being mounted for displacement from the cylinder when a bowed portion of the cylinder passes the sensing member, an apertured conduit to deliver at least one stream of heat transferring medium on to the sensed bowed portion of the cylinder when it is in the trajectory of the stream, a valve controlling the supply of heat transferring medium to the delivery means, and actuating means for the valve operable under control of said sensing member to effect delivery of the stream only during passage of the sensed bowed portion through the trajectory of the stream.

6. For detecting bowing in rotating cylinders and for straightening the cylinders by controlling the bowing when detected, apparatus comprising a sensing member responsive to bowing in the cylinder and arranged to run on that portion of the length of the cylinders wherein maximum bowing occurs, the sensing member being mounted for displacement from the cylinder when a bowed portion of the cylinder passes the sensing member, an apertured conduit to deliver at least one stream of heat transferring medium on to the sensed bowed portion of the cylinder when it is in the trajectory of the stream, a valve controlling the supply of heat transferring medium to the delivery means, an electric switch controlled by said sensing member, and a time-delay mechanism interposed between said switch and valve and operable under control of said sensing member to synchronise operation of the valve with the linear speed of the cylinder whereby the stream is delivered as the sensed bowed portion reaches the trajectory of the stream and is cut off as soon as the bowed portion of the cylinder has passed through the stream.

7. For detecting bowing in rotating cylinders and for straightening the cylinders by controlling the bowing when detected, apparatus comprising an apertured conduit to deliver at least one stream of a gaseous medium on to the bowed portion of a cylinder when said bowed portion is in the trajectory of the stream, a valve to control the supply of gaseous medium to said conduit, an electric switch to control operation of said valve, a sensing roller supported for free rotation about its axis and for peripheral engagement with that portion of the length of a cylinder wherein maximum bowing occurs, connecting means connecting said roller and switch to control operation of the switch as a result of bodily displacement of the roller when a bowed portion of the cylinder passes it, and time-delay mechanism interposed between said switch and valve and operable under control of said sensing roller to synchronise operation of the valve with the linear speed of the cylinder whereby the stream is delivered from said conduit as the sensed bowed portion reaches the trajectory of the stream and is cut off as soon as the bowed portion of the cylinder has passed through the stream.

References Cited in the file of this patent

UNITED STATES PATENTS

| Number | Name | Date |
| --- | --- | --- |
| 1,954,027 | Smith | Apr. 10, 1934 |
| 1,982,571 | Clark | Nov. 27, 1934 |